2,953,580

$\Delta^{7,9(11)}$-7-ALKOXY STEROIDS AND PROCESS

John M. Chemerda, Metuchen, and Theodore A. Jacob, Cranford, N.J., assignors to Merck & Co., Inc., Rahway, N.J., a corporation of New Jersey No Drawing. Filed May 16, 1957, Ser. No. 659,460

7 Claims. (Cl. 260—397.2)

This invention is concerned generally with steroid compounds having an oxygen atom attached to the carbon atom in the 7-position of the molecule and with processes for preparing these 7-oxygenated steroid compounds. More particularly, it relates to a novel process for converting $\Delta^7$-cyclopentanopolyhydrophenanthrene compounds of the allo series to the corresponding $\Delta^{8(9)}$-7-keto-allo-cyclopentanopolyhydrophenanthrene compounds, and to the intermediate compounds thus obtained. The $\Delta^{8(9)}$-7 - keto - allo - cyclopentanopolyhydrophenanthrene compounds prepared in accordance with our novel procedure are valuable as intermediates in the synthesis of steroid compounds having an oxygen atom attached to the 11-carbon atom such as the adrenal hormones, cortisone and hydrocortisone.

This is a continuation-in-part of copending applications Serial No. 353,684, filed May 7, 1953, now abandoned and Serial No. 556,481, filed December 30, 1955, now Patent No. 2,919,270, which, in turn, is a continuation-in-part of application Serial No. 240,052, filed August 2, 1951, now Patent No. 2,734,897, issued February 14, 1956.

The $\Delta^{8(9)}$-7-keto - allo - cyclopentanopolyhydrophenanthrene compounds, subject of the present invention have at rings B and C the following chemical structure:

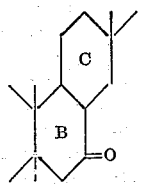

These $\Delta^{8(9)}$-7-keto - allo - cyclopentanopolyhydrophenanthrene compounds can be prepared as follows: A $\Delta^7$-allo-cyclo-pentanopolyhydrophenanthrene compound (Compound 1 hereinbelow) is reacted with a halogenating agent to form the corresponding $\Delta^{8(9)}$-7,11-dihalo-allo-cyclopentanopolyhydrophenanthrene compound (Compound 2) which is reacted with an alcoholic alkali to form the corresponding $\Delta^{8(9)}$-7-alkoxy-11-hydroxy - cyclopentanopolyhydrophenanthrene compound (Compound 3) and reacting this compound with a hydrolyzing agent, thereby producing the corresponding $\Delta^{8(9)}$-7-keto-allo-cyclopentanopolyhydrophenanthrene compound (Compound 4).

The reactions indicated hereinabove may be chemically represented, insofar as the changes taking place in rings B and C are concerned, as follows:

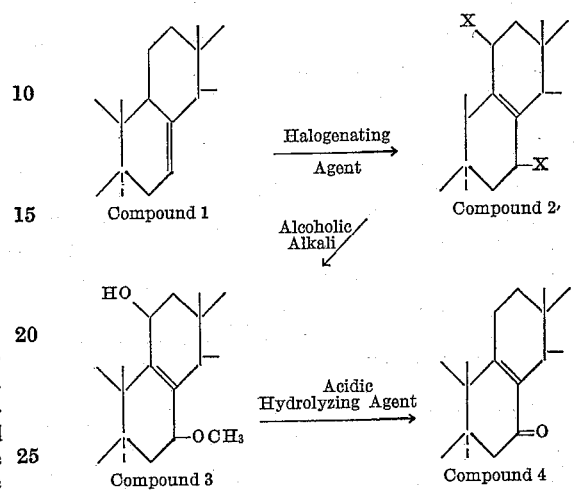

The $\Delta^7$-allo-cyclopentanopolyhydrophenanthrene compounds which we ordinarily employ as starting materials in our novel process are those having a sterol side chain attached to the carbon atom in the 17-position of the molecule as for example $\Delta^{7,22}$-ergostadiene compounds such as $\Delta^{7,22}$-3-acyloxy-ergostadiene, $\Delta^{7,22}$-3-acetoxy-ergostadiene, $\Delta^{7,22}$-stigmastadiene compounds, such as $\Delta^{7,22}$-3-acyloxy-stigmastadiene, $\Delta^{7,22}$-3-acetoxy-stigmastadiene, a degraded bile acid side chain attached to the 17-carbon atom such as $\Delta^7$-3-acyloxy-bisnorallo-cholenic acid, $\Delta^7$-3-acetoxy-bisnorallocholenic acid, a 17-acetyl substituent such as $\Delta^7$-3-acyloxy-20-keto-allopregnene, $\Delta^7$-3-acetoxy-20-keto-allopregnene, a sapogenin side chain as, for example, $\Delta^7$-dehydrotigogenin compounds such as $\Delta^7$-dehydrotigogenin acylate, $\Delta^7$-dehydrotigogenin acetate, and the like.

These $\Delta^7$ - allo - cyclopentanopolyhydrophenanthrene compounds utilized as starting materials in our process, can be prepared starting with the readily available $\Delta^5$-cyclopentanopolyhydrophenanthrene compounds, such as cholesterol, diosgenin, and the like, by treating said $\Delta^5$-allo - cyclopentanopolyhydrophenanthrene compound (Compound 4 hereinbelow) with N-bromosuccinimide to form the corresponding $\Delta^5$-7-bromo-cyclopentanopolyhydrophenanthrene compound (Compound 5), reacting the latter compound with a tertiary amine to form the corresponding $\Delta^{5,7}$-cyclopentanopolyhydrophenanthrene compound (Compound 6), and reacting said $\Delta^{5,7}$-cyclopentanopolyhydrophenanthrene compound with hydrogen in the presence of Raney nickel catalyst thereby selectively reducing the unsaturated linkage attached to the C–5 carbon atom to form the corresponding $\Delta^7$-allo-cyclopentanopolyhydrophenanthrene compound (Compound 1). The reactions indicated hereinabove may be chemically represented, insofar as the chemical changes taking place in rings B and C are concerned, as follows:

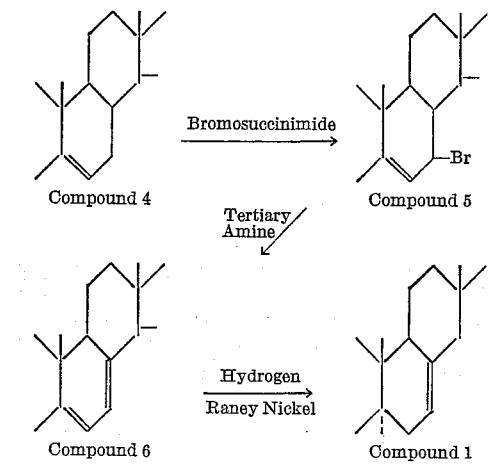

As set forth hereinabove, our novel process for converting Δ$^7$-allo-cyclopentanopolyhydrophenanthrene compounds to the corresponding Δ$^{8(9)}$-7-keto-allo-cyclopentanopolyhydrophenanthrene compound involves reacting said Δ$^7$ - allo - cyclopentanopolyhydrophenanthrene compound with a halogenating agent and reacting the halogenated intermediate thus obtained with an alcoholic alkali. We ordinarily conduct this halogenation reaction utilizing a brominating agent since the bromination reaction takes place readily with the formation of high yields of the corresponding polybrominated intermediate, and because this polybrominated intermediate reacts readily with an alcoholic alkali to produce the desired Δ$^{8(9)}$-7-keto-allo-cyclopentanopolyhydrophenanthrene compound. We ordinarily employ bromine as the brominating agent. The optimum amount of bromine for the reaction is three to five moles of bromine per mole of steroid, when the compound used as starting material is a Δ$^7$-allo-cyclopentanopolyhydrophenanthrene compound containing an unsaturated C-17 side chain as, for example, a Δ$^{7,22}$-ergostadiene compound, a Δ$^{7,22}$-stigmastadiene compound, and the like. When the compound used as starting material is a Δ$^7$-allo-cyclopentanopolyhydrophenanthrene compound containing a saturated C-17 side chain as, for example, a Δ$^7$-dehydrosapogenin such as Δ$^7$-dehydrotigogenin, optimum results are secured with as little as two moles of bromine per mole of the Δ$^7$-allo-cyclopentanopolyhydrophenanthrene compound. The larger requirement for bromine in the case of the steroid compounds containing an unsaturated side chain can be explained by the fact that the olefinic linkage in the side chain is readily brominated, thus consuming one additonal mole of reagent, whereas substitution of bromine in a saturated steroid side chain takes place relatively slowly.

The bromination reaction is ordinarily conducted by adding bromine to a solution of the Δ$^7$-allo-cyclopentanopolyhydrophenanthrene compound, preferably in the cold. As solvent for the reaction, we employ an organic solvent substantially inert to halogenation as, for example, a chlorinated hydrocarbon solvent such as chloroform, carbon tetrachloride, a hydrocarbon solvent such as toluene, a dialkyl ether such as diethyl ether, dibutyl ether, and the like.

The temperature at which the bromination reaction can be carried out is determined by the stability of the polybrominated intermediates in the particular solvent utilized for the reaction, and also by the freezing point of said solvent. For example, when carbon tetrachloride (which freezes at about −23° C.) is employed, we have found that the reaction can be conducted at a temperature of about −20° C. since the polybrominated intermediates are relatively stable in carbon tetrachloride solution at this temperature. When halogenated solvents other than carbon tetrachloride, or when dialkyl ethers are used as the reaction medium, it has been found, however, that the polybrominated intermediates are relatively unstable at temperatures above −25° C.; when these latter solvents are employed, we ordinarily employ reaction temperatures below −30° C. It is presently preferred to conduct the reaction utilizing chloroform as the solvent for the reaction, this solvent having been found to give optimum yields, and to employ a temperature within the range of about −50° C. to −65° C. If desired, the bromination reaction can be carried out utilizing temperatures substantially below −65° C. utilizing ethereal solutions as the solvent medium. At such low reaction temperatures, however, the rate of reaction is substantially decreased, and high yields obtained using our preferred reaction conditions, chloroform at about −50 to −65° C., are not greatly improved.

The time required for carrying out the bromination reaction varies somewhat depending on mechanical factors such as efficiency of mixing, etc. The rate at which the reaction takes place is, however, readily ascertainable by observance of the disappearance of the bromine color from the reaction solution. Where two moles of bromine are reacted with one mole of a Δ$^7$-allo-cyclopentanopolyhydrophenanthrene compound containing a saturated C-17 side chain, or where three moles of bromine are reacted with one mole of a Δ$^{7,22}$-allo-cyclopentanopolyhydrophenanthrene compound, the completion of the reaction is readily detected by the complete disappearance of the bromine color from the reaction solution. Where bromine is employed slightly in excess of the above ratios, the bromine-induced color disappears very slowly, and when the excess bromine is of the order of one molecular equivalent, the bromine color is never discharged completely. We have ascertained that, utilizing our preferred solvent and reaction temperature, and employing four molecular equivalents of bromine per mole of Δ$^7$-allo-cyclopentanopolyhydrophenanthrene compound the reaction is ordinarily complete after a reaction period of about four hours.

The method of bringing the reactants together in the reaction solution is not critical. The bromine can be added portionwise, either as liquid bromine or dissolved in an organic solvent inert to bromine, directly to the cold solution containing the Δ$^7$-allo-cyclopentanopolyhydrophenanthrene compound. Alternatively, a solution of bromine in the reaction solvent, and a solution of the steroid compound, both cooled to the reaction temperature, can be mixed rapidly, and the resulting mixture stirred until the bromination reaction is substantially complete.

Instead of utilizing bromine alone as the brominating agent, we can use an N-bromamide such as N-bromosuccinimide, N-bromoacetamide, and the like, in conjunction with a relatively small amount of bromine which serves to initiate the reaction. The quantity of bromine which we use ranges, depending on whether or not the Δ$^7$ - allo - cyclopentanopolyhydrophenanthrene compound contains an unsaturated C-17 side chain, from a trace of bromine up to an amount slightly in excess of one molecular equivalent. The N-bromamide apparently does not brominate directly but, instead, serves as a source of free bromine in the following way: The free bromine used in conjunction with the N-bromamide undergoes a substitution reaction with the Δ$^7$-allo-cyclopentanopolyhydrophenanthrene compound with the resultant formation of free hydrogen bromide; the hydrogen bromide, thus liberated, reacts with N-bromamide thereby generating additional bromine which, in turn, undergoes reaction with the steroid compound. The foregoing cycle is repeated until formation of the polybrominated intermediate is complete. In Δ$^7$-allo-cyclopentanopolyhydrophenanthrene compounds having a saturated C-17 side chain, as for example, in compounds belonging to the sapogenin series, only a trace of bromine or of hydrobromic acid itself need be used in conjunction with the N-bromamide. Trace amounts of bromine suffice here because reactions involving $\Delta^7$-allo-cyclopentanopolyhydrophenanthrene compounds are substitution reactions; hydrobromic acid is thus continually liberated, and will, in turn, continually generate bromine by reaction with the N-bromamide component of the reaction mixture. In the case of $\Delta^7$-allo-cyclopentanopolyhydrophenanthrene compounds containing an unsaturated C-17 side chain such as $\Delta^{7,22}$-ergostadiene compounds and $\Delta^{7,22}$-stigmastadiene compounds, we ordinarily utilize a slight excess above one molecular equivalent of bromine in conjunction with the N-bromamide. This is necessary because the addition of bromine at the $\Delta^{22}$-ethylenic linkage (which takes place concurrently with nuclear bromination in rings B and C) does not produce the hydrobromic acid essential for generating additional bromine by reaction with the N-bromamide. Irrespective of whether the $\Delta^7$-allo-cyclopentanopolyhydrophenanthrene compound contains a saturated or unsaturated C-17 side chain, we ordinarily utilize two to three moles of the N-bromamide per mole of the steroid compound. We prefer to use approximately two moles of N-bromosuccinimide.

Instead of utilizing a brominating agent, we can also employ a chlorinating agent as, for example, chlorine or an N-chloroamide such as N-chloroacetamide, N-chlorosuccinimide, and the like, in conjunction with a relatively small amount of chlorine or of hydrogen chloride to initiate the reaction in accordance with the reaction mechanism described hereinabove in connection with the employment of the N-bromamides. The reaction conditions which we use when employing these chlorinating agents are substantially identical to those used with the corresponding brominating agents, and the polychlorinated intermediates thus formed correspond in structure to the polybrominated intermediates referred to hereinabove. We prefer to use the brominating agents, however, for the reason that the polychlorinated intermediates are less readily dehalogenated than the corresponding polybrominated derivatives. Other halogenating agents such as iodinating agents, fluorinating agents, and the like, are unsatisfactory in our overall procedure, since the iodinating agents are not sufficiently active to form the corresponding polyiodinated intermediates and since, in cases where fluorinating agents are employed, defluorination of the polyfluorinated intermediate has not proven to be practical.

In accordance with the foregoing halogenation procedure, there are obtained novel polyhalogenated steroid compounds including $\Delta^{8(9)}$-7,11-dihalo-allocyclopentanopolyhydrophenanthrene compounds as, for example $\Delta^{8(9)}$-7,11,22,23-tetrahalo-ergostene compounds such as $\Delta^{8(9)}$-3-acyloxy-7,11,22,23-tetrahalo-ergostene, $\Delta^{8(9)}$-3-acyloxy-7,11,22,23-tetrabromo-ergostene, $\Delta^{8(9)}$-3-acetoxy-7,11,22,23-tetrabromo-ergostene, $\Delta^{8(9)}$-3-acetoxy-7,11,22,23-tetrachloro-ergostene, $\Delta^{8(9)}$-7,11,22,23-tetrahalo-stigmastene compounds such as $\Delta^{8(9)}$-3-acyloxy-7,11,22,23-tetrahalo-stigmastene, $\Delta^{8(9)}$-3-acyloxy-7,11,22,23-tetrabromo-stigmastene, $\Delta^{8(9)}$-3-acetoxy-7,11,22,23-tetrabromo-stigmastene, $\Delta^{8(9)}$-3-acetoxy-7,11,22,23-tetrachloro-stigmastene, $\Delta^{8(9)}$-7,11-dihalo-dehydrosapogenin compounds, $\Delta^{8(9)}$-7,11-dihalo-dehydrotigogenin compounds such as $\Delta^{8(9)}$-7,11-dihalo-dehydrotigogenin acylate, $\Delta^{8(9)}$-7,11-dibromo-dehydrotigogenin acylate, $\Delta^{8(9)}$-7,11-dibromo-dehydrotigogenin acetate, $\Delta^{8(9)}$-7,11-dichloro-dehydrotigogenin acetate, $\Delta^{8(9),22}$-7,11-dihalo-ergostadiene compounds such as $\Delta^{8(9),22}$-3-acetoxy-7,11-dibromo-ergostadiene, $\Delta^{8(9),22}$-3-acetoxy-7,11-dichloro-ergostadiene, $\Delta^{8(9),22}$-7,11-dihalo-stigmastadiene compounds such as $\Delta^{8(9),22}$-3-acyloxy-7,11-dibromo-stigmastadiene, $\Delta^{8(9),22}$-3-acetoxy-7,11-dibromo-stigmastadiene, $\Delta^{8(9),22}$-3-acetoxy-7,11-dichloro-stigmastadiene, as well as polybrominated intermediates containing four bromo substituents attached in rings B and C as, for example 7,8,9,11,22,23-hexahaloergostane compounds such as 3-acyloxy-7,8,9,11,22,23-hexabromo-ergostane, 3-acetoxy-7,8,9,11,22,23-hexabromoergostane, 7,8,9,11,22,23-hexachloroergostane, 7,8,9,11,22,23-hexahalostigmastane compounds such as 3-acyloxy-7,8,9,11,22,23-hexabromo-stigmastane, 3-acetoxy-7,8,9,11,22,23-hexabromo-stigmastane, 7,8,9,11-tetrahalo-tigogenin compounds such as 7,8,9,11-tetrabromo-tigogenin acylate, 7,8,9,11-tetrabromo-tigogenin acetate, and polyhalogenated sapogenin compounds wherein the saturated C-17 side chain contains one or more bromo or chloro substituents and the like.

The novel polyhalogenated steroid compounds which may be prepared in accordance with our process also include $\Delta^7$-9,11-dihalo-allo-cyclopentanopolyhydrophenanthrene compounds, as for example, $\Delta^7$-3-acyloxy-9,11,22,23-tetrahalo-ergostene, $\Delta^7$-3-acetoxy-9,11,22,23-tetrabromo-ergostene, $\Delta^7$-3-acyloxy-9,11,22,23-tetrahalo-stigmastene, $\Delta^7$-3-acetoxy-9,11,22,23-tetrabromo-stigmastene, $\Delta^7$-9,11-dihalo-dehydrotigogenin acylate, $\Delta^7$-9,11-dibromo-dehydrotigogenin acetate, as well as $\Delta^{9(11)}$-7,8-dihalo-allo-cyclopentanopolyhydrophenanthrene compounds, as for example, $\Delta^{9(11)}$-3-acyloxy-7,8,22,23-tetrahalo-ergostene, $\Delta^{9(11)}$-3-acetoxy-7,8,22,23-tetrabromo-ergostene, $\Delta^{9(11)}$-3-acyloxy-7,8,22,23-tetrahalo-stigmastene, $\Delta^{9(11)}$-3-acetoxy-7,8,22,23-tetrabromo-stigmastene, $\Delta^{9(11)}$-7,11-dihalodehydrotigogenin acylate, $\Delta^{9(11)}$-7,11-dibromo-dehydrotigogenin acetate, and the like. These $\Delta^7$-9,11-dihalo-allo-cyclopentanopolyhydrophenanthrene compounds and $\Delta^{9(11)}$-7,8-dihalo-allo-cyclopentanopolyhydrophenanthrene compounds ordinarily rearrange, however, due to allylic migration of the tertiary bromine attached to the C-9 carbon atom, to produce the corresponding $\Delta^8$-7,11-dihalo-allo-cyclopentanopolyhydrophenanthrene compounds.

As set forth hereinabove, we ordinarily employ, per mole of $\Delta^7$-allo-cyclopentanopolyhydrophenanthrene compound, at least two moles of halogen, or at least two moles of N-haloamide in conjunction with a trace amount of halogen or hydrogen halide, supplemented, in either case, by an additional mole of halogen where the $\Delta^{8(9)}$-allo-cyclopentanopolyhydrophenanthrene compound contains an unsaturated C-17 side chain. We have found that, when lower molar ratios of bromine, chlorine, N-bromacetamide, N-chloracetamide, N-bromsuccinimide or N-chlorsuccinimide are employed, the product of the halogenation reaction is a partially halogenated intermediate, which upon reaction with alcoholic alkali followed by acid hydrolysis is converted to the desired $\Delta^{8(9)}$-7-keto-allo-cyclopentanopolyhydrophenanthrene compound in poor yield and in impure form. Our procedure, however, utilizing the specified proportion of halogenating agent, ordinarily results in the obtainment of the desired $\Delta^{8(9)}$-7-keto-allocyclopentanopolyhydrophenanthrene compound in a yield approaching 90% of that theoretically obtainable.

The polybrominated or polychlorinated $\Delta^{8(9)}$-allo-cyclopentanopolyhydrophenanthrene compound is then reacted with an alcoholic alkali thereby forming the corresponding $\Delta^{7,9,(11)}$-7-alkoxy-cyclopentanopolyhydrophenanthrene compound. We ordinarily utilize an excess, preferably about 200% of the theoretical amount of the alkali. As the alkali, we prefer to use alkali metal alkoxides such as sodium ethoxide, sodium methoxide, sodium propoxide, potassium methoxide, potassium ethoxide, and the like, although alkali metal hydroxides, such as sodium hydroxide and potassium hydroxide can be employed, if desired. The dehalogenation and rearrangement reaction is conducted in an alcoholic medium as, for example, a lower alkanol such as ethanol, methanol, propanol, butanol, and the like.

The reaction between the $\Delta^{8(9)}$-polyhalogenated-allo-cyclopentanopolyhydrophenanthrene compound and the alcoholic alkali is conveniently conducted by adding the latter directly to the halogenation mixture without isolating the intermediate polyhalogenated steroid compound. Where the alkali used is an alkali metal alkoxide, this reagent is usually added to the halogenation reaction solution containing the $\Delta^{8(9)}$-polyhalogenated steroid compound in the form of a solution or suspension in the lower alkanol.

We usually employ a low initial reaction temperature (about $-60°$ C.) in view of the fact that the polyhalogenated intermediate is somewhat unstable in the halogenated hydrocarbon reaction solvent. Somewhat higher temperatures can be used, if desired, up to approximately $-30°$ C. in a chloroform medium, and up to about $-10°$ C. to $-20°$ C. in carbon tetrachloride or toluene. The reaction time may be varied from about five hours to eight hours or longer. In accordance with this method, there is obtained a 7-alkoxy-cyclopentanopolyhydrophenanthrene compound, more particularly, a $\Delta^{7,9,(11)}$ - 7 - alkoxy - cyclopentanopolyhydrophenanthrene compound and/or a $\Delta^{8(9)}$-7,11-dialkoxy-cyclopentanopolyhydrophenanthrene compound and/or a $\Delta^{8(9)}$ - 7 - alkoxy - 11 - hydroxy - cyclopentanopolyhydrophenanthrene compound.

This 7-alkoxy-substituted cyclopentanopolyhydrophenanthrene intermediate is not ordinarily isolated from the reaction mixture but is reacted directly with a hydrolyzing agent under acid conditions, thereby forming the corresponding $\Delta^{8(9)}$-7-keto-cyclopentanopolyhydrophenanthrene compound. We ordinarily employ, as the hydrolyzing agent, an aqueous solution of a mineral acid as, for example, sulfuric acid, phosphoric acid, a hydrohalic acid such as hydrochloric acid, hydrobromic acid, and the like. The reaction is conveniently conducted in an aqueous alcoholic medium as, for example, an aqueous alkanol, aqueous methanol, aqueous ethanol, and the like, which may also contain if desired, a hydrocarbon liquid such as benzene, toluene, ligroin, a halogenated hydrocarbon liquid such as chloroform, and the like. This hydrolysis reaction is ordinarily carried out by heating the intermediate 7-alkoxy-cyclopentanopolyhydrophenanthrene compound, preferably dissolved in a halogenated hydrocarbon solvent, with the aqueous alcoholic mineral acid at approximately reflux temperature under which conditions the hydrolysis reaction is usually complete after a heating period of about one hour. Lower or higher temperatures and correspondingly longer or shorter hydrolysis times can be used, however, if desired. The $\Delta^{8(9)}$ - 7 - keto - cyclopentanopolyhydrophenanthrene compound is isolated from the reaction mixture by neutralizing the acid and evaporating the solvent. The $\Delta^{8(9)}$ - 7 - keto - allo - cyclopentanopolyhydrophenanthrene compound thus obtained can be purified by recrystallization from a lower alkanol such as methanol.

Although, as set forth hereinabove, the reaction between the alcoholic alkali and the $\Delta^{8(9)}$-polyhalogenated steroid compound is ordinarily carried out directly on the halogenation reaction mixture without isolating the polyhalogenated intermediate, the $\Delta^{8(9)}$-polybrominated or polychlorinated steroid compound can be isolated, if desired, prior to reacting it with the alcoholic alkali. This isolation is ordinarily achieved by adding to the halogenation solution an oxygenated organic solvent miscible with said solution as, for example, a lower dialkyl ketone such as acetone, or a lower alkanol such as methanol or ethanol, whereupon the polybrominated or polychlorinated steroid compound precipitates and is recovered by filtration or centrifugation. This isolation procedure is ordinarily conducted at temperatures below about $-10°$ C. due to the instability of the halogenated intermediate in the usual reaction solvent, chloroform. Where carbon tetrachloride is used as the halogenating solvent, however, the dilution of the reaction mixture with the alkanol or ketone can be conducted at higher temperatures, even up to room temperature, without appreciable decomposition of the polyhalogenated steroid compound. The isolated, dried polybrominated and polychlorinated steroids obtained in accordance with our halogenation procedure are moderately stable at ordinary temperatures, and their physical properties are thus readily ascertainable.

The polybrominated or polychlorinated steroid compounds (such as our preferred $\Delta^{8(9)}$-7,11-dihalo-allo-cyclopentanopolyhydrophenanthrene compounds) which can be isolated as set forth hereinabove, are then reacted with the alcoholic alkali followed by an acidic hydrolyzing agent utilizing substantially the same reaction conditions as those employed in the direct treatment of the halogenation reaction solution. While this modification in our process can also be conducted in a halogenated hydrocarbon solvent such as chloroform, carbon tetrachloride, and the like, it may be convenient to utilize a dialkyl ether, a lower alkanol, and the like, at the low temperatures utilized in this reaction.

In accordance with our procedure wherein a $\Delta^{8(9)}$-7,11 - dihalo - allo - cyclopentanopolyhydrophenanthrene compound is reacted with an alcoholic alkali followed by an acidic hydrolyzing agent, the halogen substituents are removed from the B and C rings of the nucleus with the formation of the corresponding $\Delta^{8(9)}$-7-keto-allo-cyclopentanopolyhydrophenanthrene compound, but any halogen substituents which may be attached to the C-17 side chain are not attacked. When a $\Delta^{8(9)}$-7,11-dihalo-allo-cyclopentanopolyhydrophenanthrene compound containing one or more halogen substituents attached to the C-17 side chain as, for example, a $\Delta^{8(9)}$-7,11,22,23-tetrabromergostene compound such as $\Delta^{8(9)}$-3-acetoxy-7,11,22,23 - tetrabromo - ergostene, a $\Delta^{8(9)}$ - 7,11,22,23 - tetrahalostigmastene compound such as $\Delta^{8(9)}$-3-acetoxy-7,11,22,23-tetrabromo-stigmastene, a $\Delta^{8(9)}$-7,11-dihalo-dehydrotigogenin compound containing a halogen substituent attached to the C-17 side chain such as 7,11,23-tribromotigogenin acetate, a 7,8,9,11-tetrahalo-allo-cyclopentanopolyhydrophenanthrene compound containing one or more halogen substituents attached to the C-17 side chain, as, for example, a 7,8,9,11,22,23-hexahalo-ergostane compound such as 3-acetoxy-7,8,9,11,22,23-hexabromo-ergostane, a 7,8,9,11,22,23-hexahalo-stigmastane compound such as 3-acetoxy-7,8,9,11,22,23-hexabromo-stigmastane, a 7,8,9,11-tetrahalo-tigogenin compound containing a halo substituent in the C-17 side chain such as 7,8,9,11,23-pentabromo-tigogenin acetate, and the like, is reacted with an alcoholic alkali followed by a hydrolyzing agent, there is obtained the corresponding $\Delta^{8(9)}$ - 7 - keto - cyclopentanopolyhydrophenanthrene compound wherein the halo substituent or substituents attached to the C-17 side chain are unaffected, as for example, a $\Delta^{8(9)}$-7-keto-22,23-dihalo-ergostene compound such as $\Delta^{8(9)}$-3-acyloxy-7-keto-22,23-dihalo-ergostene, $\Delta^{8(9)}$ - 3 - acetoxy - 7 - keto - 22,23 - dibromo-ergostene, $\Delta^{8(9)}$ - 3 - acetoxy - 7 - keto - 22,23 - dichloro - ergostene, a $\Delta^{8(9)}$ - 7 - keto - 22,23 - dihalo - stigmastene compound such as $\Delta^{8(9)}$ - 3 - acyloxy - 7 - keto - 22,23 - dihalo-stigmastene, $\Delta^{8(9)}$ - 3 - acetoxy - 7 - keto - 22,23 - dibromo-stigmastene, $\Delta^{8(9)}$ - 3 - acetoxy - 7 - keto - 22,23 - dichloro - stigmastene, a $\Delta^{8(9)}$ - 7 - keto - dehydrotigogenin compound containing a halo substituent attached to the C-17 side chain such as $\Delta^{8(9)}$-7-keto-23-halo-dehydrotigogenin acylate, $\Delta^{8(9)}$-7-keto-23-bromo-dehydrotigogenin acetate, and the like.

Although the $\Delta^7$-allo-cyclopentanopolyhydrophenanthrene compounds having a hydroxyl substituent attached to the C-3 carbon atom, such as $\Delta^{7,22}$-3-hydroxy-ergostadiene, $\Delta^{7,22}$-3-hydroxy-stigmastadiene, $\Delta^7$-3-hydroxy-dehydrotigogenin, are ordinarily reacted with an acylating agent to convert the 3-hydroxy substituent to an acyloxy radical prior to the halogenation reaction, both the halogenation operation and the subsequent reaction with an alcoholic alkali followed by a hydrolyzing agent can be conducted utilizing compounds such as $\alpha$-dihydroergosterol, 7-dehydrotigogenin, and the like, which possess free hydroxyl groups.

The $\Delta^{8(9)}$ - 7 - keto - allo - cyclopentanopolyhydrophenanthrene compound containing one or more halogen substituents attached to the C-17 side chain, prepared as set forth hereinabove, can be dehalogenated, if desired, by reaction with a bivalent metal such as zinc, magnesium, and the like, in conjunction with an acid, preferably a lower alkanoic acid such as acetic acid. The reaction is normally conducted at the reflux temperature of the alkanoic acid. In accordance with this dehalogenation procedure, there is obtained a $\Delta^{8(9)}$-7-keto-allo-cyclopentanopolyhydrophenanthrene compound free of halogen substituents in the C-17 side chain, as for example, a $\Delta^{8(9),22}$-7-keto-ergostadiene compound such as $\Delta^{8(9),22}$ - 3 - acyloxy - 7 - keto - ergostadiene, $\Delta^{8(9),22}$ - 3 - acetoxy - 7 - keto - ergostadiene, a $\Delta^{8(9),22}$ - 7 - keto - stigmastadiene compound such as $\Delta^{8(9),22}$-3-acyloxy-7-keto - stigmastadiene, $\Delta^{8(9),22}$ - 3 - acetoxy - 7 - keto - stigmastadiene, a $\Delta^{8(9)}$ - 7 - keto - dehydrosapogenin compound, more particularly, a $\Delta^{8(9)}$ - 7 - keto - dehydrotigogenin compound such as $\Delta^{8(9)}$-7-keto-dehydrotigogenin acylate, $\Delta^{8(9)}$-7-keto-dehydrotigogenin acetate, and the like.

These $\Delta^{8(9)}$ - 7 - keto - allo - cyclepentanopolyhydrophenanthrene compounds are reacted with an acylating agent, for example, a lower alkanoic anhydride such as acetic anhydride, propanoic anhydride and the like, in the presence of a catalyst such as acetyl chloride, p-toluene sulfonic acid, pyridine and the like, thereby forming the corresponding $\Delta^{7,9(11)}$ - 7 - acyloxy - allo - cyclopentanopolyhydrophenanthrene compound such as $\Delta^{7,9(11),22}$-7-acyloxy-ergostatriene,
$\Delta^{7,9(11),22}$-3,7-diacyloxy-ergostatriene,
$\Delta^{7,9(11),22}$-3,7-dialkanoxy-ergostatriene,
$\Delta^{7,9(11),22}$-3,7-diacetoxy-ergostatriene,
$\Delta^{7,9(11)}$-7-acyloxy-cholestadiene,
$\Delta^{7,9(11)}$-3,7-diacyloxy-cholestadiene,
$\Delta^{7,9(11)}$-3,7-dialkanoxy-cholestadiene,
$\Delta^{7,9(11)}$-3,7-diacetoxy-cholestadiene,
$\Delta^{7,9(11),22}$-3,7-diacyloxy-stigmastatriene,
$\Delta^{7,9(11),22}$-3,7-dialkanoxy-stigmastatriene,
$\Delta^{7,9(11),22}$-3,7-diacetoxy-stigmastatriene,
$\Delta^{7,9(11)}$-3,7-diacyloxy-choladienic acid,
$\Delta^{7,9(11)}$-3,7-dialkanoxy-choladienic acid,
$\Delta^{7,9(11)}$-3,7-diacetoxy-choladienic acid,
$\Delta^{7,9(11)}$-3,7-diacyloxy-allocholadienic acid,
$\Delta^{7,9(11)}$-3,7-dialkanoxy-allocholadienic acid,
$\Delta^{7,9(11)}$-3,7-diacetoxy-allocholadienic acid,
$\Delta^{7,9(11)}$-3,7-diacyloxy-bisnorcholadienic acid,
$\Delta^{7,9(11)}$-3,7-dialkanoxy-bisnorcholadienic acid,
$\Delta^{7,9(11)}$-3,7-diacetoxy-bisnorcholadienic acid,
$\Delta^{7,9(11)}$-3,7-diacyloxy-bisnorallocholadienic acid,
$\Delta^{7,9(11)}$-3,7-dialkanoxy-bisnorallocholadienic acid,
$\Delta^{7,9(11)}$-3,7-diacetoxy-bisnorallocholadienic acid,
$\Delta^{7,9(11)}$-3,7-diacyloxy-etiocholadienic acid,
$\Delta^{7,9(11)}$-3,7-diacyloxy-etioallocholadienic acid,
$\Delta^{7,9(11)}$-3,7-diacyloxy-pregnadiene,
$\Delta^{7,9(11)}$-3,7-dialkanoxy-pregnadiene,
$\Delta^{7,9(11)}$-3,7-diacetoxy-pregnadiene,
$\Delta^{7,9(11)}$-3,7-diacyloxy-allopregnadiene,
$\Delta^{7,9(11)}$-3,7-dialkanoxy-allopregnadiene,
$\Delta^{7,9(11)}$-3,7-diacetoxy-allopregnadiene,
$\Delta^{7,9(11)}$-7-acyloxy-dehydrotigogenin acylate,
$\Delta^{7,9(11)}$-7-alkanoxy-dehydrotigogenin alkanoate,
$\Delta^{7,9(11)}$-7-acetoxy-dehydrotigogenin acetate, and the like.

These $\Delta^{7,9(11)}$ - 7 - acyloxy - allo - cyclopentanopolyhydrophenanthrenes and, in particular, $\Delta^{7,9(11),22}$-3,7-diacetoxy-ergostatriene, can be converted to cortisone in accordance with methods set forth in the following articles: Journal of American Chemical Society (1951), volume 73, pages 2396–7 and 4052–3; and Nature, volume 168, page 28.

The following example illustrates a method of carrying out the present invention, but it is to be understood that this example is given for purposes of illustration and not of limitation.

Example 1

To 625 ml. of dry toluene, which had been cooled to a temperature of about −70° C., was added approximately 36.3 g. (0.227 mole) of bromine. To this cold bromine solution was added, dropwise, with stirring over a fifty-minute period while maintaining the temperature of the solution at −60 to −70° C., a warm (25° C.) solution containing 25 g. (0.0567 mole) of $\Delta^{7,22}$-3-acetoxy-ergostadiene. The resulting mixture was stirred for an additional period of ninety minutes, while maintaining the temperature at about −60° C.

To this cold bromination reaction solution was added a cold (−60° C.) suspension of 42.9 g. (0.794 mole) of sodium methoxide in 1000 ml. of methanol. The resulting mixture was stirred for a period of eight hours during which time the temperature of the mixture was allowed to rise to about 25° C. The reaction mixture was filtered to remove the solid sodium methoxide, and the filtered toluene reaction solution was washed with water. The toluene solution was then evaporated in vacuo, methanol was added to the concentrate, and the solution was again evaporated until a precipitate formed. The slurry was cooled, and the precipitated material was recovered by filtration and dried to give $\Delta^{7,9(11)}$-3-hydroxy-7 - methoxy - 22,23 - dibromo-ergostadiene; M.P. 174–180° C. $[\alpha]_D = +5.9°$ (chloroform); $\lambda_{max}$. 2360A., E% 50; $\lambda_{max}$. 2440A., E% 48.

Ten grams of $\Delta^{7,9(11)}$-3-hydroxy-7-methoxy-22,23-dibromo-ergostadiene, prepared as described hereinabove, was dissolved in 350 cc. of chloroform, and to the solution was added 1000 ml. of methanol and 100 ml. of concentrated aqueous hydrochloric acid solution. The resulting solution was heated under reflux at a temperature of approximately 61° C. for a period of about one hour, the reaction mixture was cooled, washed first with water, then with aqueous sodium bicarbonate solution, again with water, and the washed chloroform solution was evaporated to dryness in vacuo. Methanol was added to the residual material, and the solution again evaporated in vacuo until a precipitate formed. The slurry was cooled, and the precipitated material was recovered by filtration to give crude $\Delta^{8(9)}$-3-hydroxy-7-keto-22,23-dibromo-ergostene; M.P. 197–204° C.; $[\alpha]_D = -5.6°$ (chloroform); $\lambda_{max}$. 2510A., E% 198; positive test for carbonyl group with 2,4-dinitrophenyl hydrazine.

Four grams of $\Delta^{8(9)}$-3-hydroxy-7-keto-22,23-dibromo-ergostene, prepared as described hereinabove, was dissolved in 400 ml. of ethyl ether, and 40 ml. of glacial acetic acid and 4.0 g. of zinc dust were added to the solution. The resulting suspension was stirred at room temperature for a period of about three hours, and the reaction mixture was filtered. The filtered ethereal solution was washed first with water, then with aqueous sodium bicarbonate solution, and again with water. The washed ethereal solution was evaporated to dryness, the residual material was dissolved in a mixture of ethyl ether and petroleum ether (B.P. 30–60° C.), and the solution was chromatographed on acid-washed alumina. The fraction eluted by 1% methanol in ethyl ether was recrystallized from a mixture of chloroform and methanol to give substantially pure $\Delta^{8(9),22}$-3-hydroxy-7-keto-ergostadiene; M.P. 177–178° C.; $[\alpha]_D = -37.9°$ (chloroform); max. 2550A., E% 214; M.P. of 2,4-dinitrophenyl hydrazone 256–257° C. (dec.).

This $\Delta^{8(9),22}$-3-hydroxy-7-keto-ergostadiene can be converted to $\Delta^{7,9(11),22}$-3,7-diacetoxy-ergostatriene in accordance with the following procedure: Four hundred milligrams of $\Delta^{8(9),22}$-3-hydroxy-7-keto-ergostadiene are mixed with 1 cc. of acetic anhydride and 1 cc. of acetyl chloride, and the mixture is heated under reflux for a period of about one hour. The solvents are evaporated from the reaction mixture to give crude $\Delta^{7,9(11),22}$-3,7-diacetoxy-ergostatriene which is obtained as a yellow gum;

max. 237 mu, $E_{1cm}^{1\%}$ 247, max. 241 mu, $E_{1cm}^{1\%}$ 252

This material is subjected to further purification by chromatography to give a product having an extinction coefficient of 320.

As set forth hereinabove this $\Delta^{7,9(11),22}$-3,7-diacetoxy-ergostatriene can be converted to cortisone in accordance with methods set forth in the following articles: Journal of American Chemical Society (1951), volume 73, pages 2396–7 and 4052–3; and Nature, volume 168, page 28.

Various changes and modifications may be made in carrying out the present invention without departing from the spirit and scope thereof. Insofar as these changes and modifications are within the purview of the annexed claims, they are to be considered as part of our invention.

We claim:

1. The process which comprises reacting $\Delta^{7,22}$-3-acetoxy-ergostadiene with bromine to produce $\Delta^{8}$-3-acetoxy-7,11,22,23-tetrabromo-ergostene, reacting this compound with methanolic sodium methoxide to produce $\Delta^{7,9(11)}$-3-hydroxy-7-methoxy-22,23-dibromo-ergostadiene, reacting the latter compound with aqueous methanolic hydrochloric acid to form $\Delta^{8(9)}$-3-hydroxy-7-keto-22,23-dibromo-ergostene, and reacting said $\Delta^{8(9)}$-3-hydroxy-7-keto-22,23-dibromo-ergostene with zinc dust and acetic acid to produce $\Delta^{8,22}$-3-hydroxy-7-keto-ergostadiene.

2. The process which comprises reacting $\Delta^{8(9)}$-3-acetoxy-7,11,22,23-tetrabromo-ergostene with sodium methoxide to produce $\Delta^{7,9(11)}$-3-hydroxy-7-methoxy-22,23-dibromo-ergostadiene.

3. The process which comprises reacting $\Delta^{7,9(11)}$-3-hydroxy-7-methoxy-22,23-dibromo-ergostadiene with aqueous methanolic hydrochloric acid to produce $\Delta^{8(9)}$-3-hydroxy-7-keto-22,23-dibromo-ergostene.

4. $\Delta^{7,9(11)}$-3-lower acyloxy-7-lower alkoxy-22,23-dihalo-ergostadiene.

5. $\Delta^{7,9(11)}$-3-hydroxy - 7 - lower alkoxy - 22,23 - dihalo-ergostadiene.

6. $\Delta^{7,9(11)}$ - 3 - acetoxy - 7 - methoxy - 22,23 - dibromo-ergostadiene.

7. $\Delta^{7,9(11)}$ - 3 - hydroxy - 7 - methoxy - 22,23 - dibromo-ergostadiene.

References Cited in the file of this patent
UNITED STATES PATENTS

| 2,734,897 | Chemerda | Feb. 14, 1956 |
| 2,790,799 | Djerassi et al. | Apr. 30, 1957 |